(12) United States Patent
Branson et al.

(10) Patent No.: US 9,069,543 B2
(45) Date of Patent: *Jun. 30, 2015

(54) PREDICTIVE OPERATOR GRAPH ELEMENT PROCESSING

(75) Inventors: Michael J. Branson, Rochester, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/334,224

(22) Filed: Dec. 22, 2011

(65) Prior Publication Data

US 2013/0166618 A1      Jun. 27, 2013

(51) Int. Cl.
  *G06F 15/16* (2006.01)
  *G06F 9/30* (2006.01)
  *G06F 9/50* (2006.01)

(52) U.S. Cl.
  CPC ........... *G06F 9/30* (2013.01); *G06F 9/5027* (2013.01); *G06F 2209/5022* (2013.01); *G06F 2209/5014* (2013.01)

(58) Field of Classification Search
  CPC ............. H04L 29/08135; H04L 29/06; H04L 29/08072
  USPC ................................................ 709/201, 221
  See application file for complete search history.

(56) References Cited

U.S. PATENT DOCUMENTS

| | | | |
|---|---|---|---|
| 5,499,340 A | 3/1996 | Barritz | |
| 6,243,755 B1 * | 6/2001 | Takagi et al. | 709/229 |
| 6,282,701 B1 | 8/2001 | Wygodny et al. | |
| 6,317,775 B1 * | 11/2001 | Coile et al. | 709/201 |
| 7,506,323 B2 | 3/2009 | Kanamaru | |
| 7,624,221 B1 * | 11/2009 | Case | 710/310 |
| 7,831,532 B2 * | 11/2010 | Horvitz | 706/45 |
| 8,078,664 B2 * | 12/2011 | Radia et al. | 709/201 |
| 8,243,911 B1 * | 8/2012 | Abidogun et al. | 379/221.03 |
| 2002/0075857 A1 * | 6/2002 | LeBlanc | 370/352 |
| 2002/0188717 A1 * | 12/2002 | Mushlin et al. | 709/224 |
| 2003/0014694 A1 | 1/2003 | Draperi | |

(Continued)

OTHER PUBLICATIONS

Aiken, P. (Ed.). (2002). Microsoft computer dictionary. (5<sup>th</sup> ed.). Redmond, WA: Microsoft Press.*

*Primary Examiner* — Kristie Shingles
*Assistant Examiner* — Timothy Sowa
(74) *Attorney, Agent, or Firm* — Patterson & Sheridan, LLP

(57) ABSTRACT

Techniques are described for predictively starting a processing element. Embodiments receive streaming data to be processed by a plurality of processing elements. An operator graph of the plurality of processing elements that defines at least one execution path is established. Embodiments determine a historical startup time for a first processing element in the operator graph, where, once started, the first processing element begins normal operations once the first processing element has received a requisite amount of data from one or more upstream processing elements. Additionally, embodiments determine an amount of time the first processing element takes to receive the requisite amount of data from the one or more upstream processing elements. The first processing element is then predictively started at a first startup time based on the determined historical startup time and the determined amount of time historically taken to receive the requisite amount of data.

11 Claims, 7 Drawing Sheets

(56) References Cited

U.S. PATENT DOCUMENTS

| | | |
|---|---|---|
| 2003/0069949 A1 | 4/2003 | Chan et al. |
| 2005/0114434 A1* | 5/2005 | Yang et al. .................... 709/201 |
| 2005/0289236 A1* | 12/2005 | Hull et al. ..................... 709/231 |
| 2008/0005392 A1* | 1/2008 | Amini et al. .................... 710/29 |
| 2009/0178059 A1* | 7/2009 | Lang et al. .................... 719/318 |
| 2010/0293532 A1* | 11/2010 | Andrade et al. .............. 717/140 |
| 2011/0131578 A1* | 6/2011 | Takagi et al. ................. 718/100 |
| 2012/0163603 A1* | 6/2012 | Abe et al. ...................... 380/278 |
| 2013/0166888 A1 | 6/2013 | Branson et al. |
| 2013/0173587 A1* | 7/2013 | Imaki et al. ................... 707/713 |

* cited by examiner

PREDICTIVE OPERATOR GRAPH ELEMENT PROCESSING

BACKGROUND

Embodiments of the present invention generally relate to stream computing applications. Specifically, the invention relates to the management of processing elements in a streaming data environment, including the predictive start up of processing elements for receiving incoming streaming data.

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments described herein provide a method, system and computer program product for predictively starting a processing element. The method, system and computer program product include receiving streaming data to be processed by a plurality of processing elements. Additionally, the method, system and computer program product include establishing an operator graph of the plurality of processing elements, the operator graph defining at least one execution path and wherein at least one of the processing elements of the operator graph is configured to receive data from at least one upstream processing element and transmit data to at least one downstream processing element. The method, system and computer program product also include determining a historical startup time for a first processing element in the operator graph, wherein, once started, the first processing element begins normal operations once the first processing element has received a requisite amount of data from one or more upstream processing elements. Furthermore, the method, system and computer program product include determining an amount of time the first processing element takes to receive the requisite amount of data from the one or more upstream processing elements. The method, system and computer program product additionally include predictively starting the first processing element at a first startup time based on the determined historical startup time and the determined amount of time historically taken to receive the requisite amount of data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
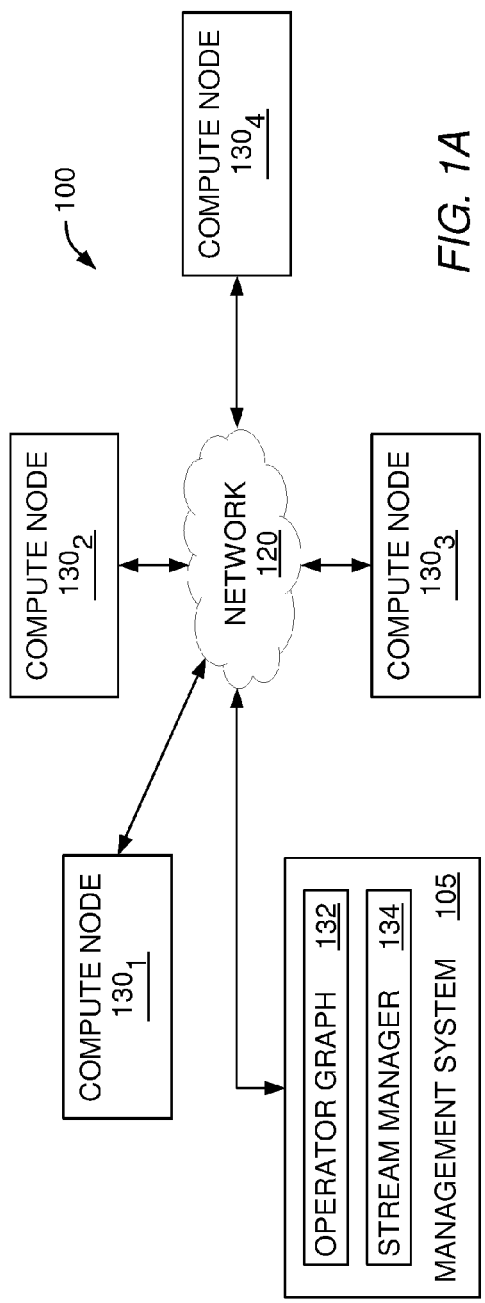
FIGS. 1A-1B illustrate a computing infrastructure configured to execute a stream computing application, according to one embodiment described herein.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each of one which contains one or more processing modules (i.e., operators). These processing elements can also be replicated on multiple nodes with load balancing among them. Operators in a stream computing application can be fused together to form a processing element. Additionally, multiple processing elements can be grouped together to form a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

However, because stream computing applications often deal with large volumes of data, the processing of which is spread over multiple processing elements across multiple compute nodes, an operator may need to produce an output faster than it is able. Instead of requiring an operator to generate output data by processing currently received input data, an operator may instead output predetermined data. This predetermined data may be based on, for example, an average of the output data that was previously processed and transmitted by the operator. Moreover, the operator may only transmit predicted output data if the previously processed output data falls within an acceptable range. That is, if the previous output data is deterministic. An operator, or data flowing out of the operator, is "deterministic" if the values of the output data can be predicted with some minimum amount of confidence. For example, output data may be predictable or deterministic because a certain input always yields a certain output or because the output data typically has a value within a certain range—e.g., the output values for an operator are within a predefined range 80% of the time. Once the output data is deemed deterministic, using the predicted output data may allow the operator to transmit output data faster, or with less processing, than it otherwise would be able.

Moreover, the operator may output predetermined data only if there is a need to limit or stop processing received input data. For example, the stream computing application may be experiencing backpressure. "Backpressure" is a term used to describe one or more operators that are unable to transmit or receive additional data because either their buffer or a buffer associated with a downstream operator is full. In the case of some real-time applications, the operator may trade accuracy for increased data throughput where the time required for data to propagate through the stream computing application is an important factor.

One advantage of stream computing application is that processing elements can be quickly moved into and out of the operator graph. As such, it may optimal in particular stream computing applications for certain processing elements to be offline until the processing elements are needed. However, because the operators within these processing elements have a requisite amount of data that must be received from one or more upstream operators before the operators can begin generating output data, there may be a delay once the processing elements are started before the operators within the processing elements can generate meaningful output or even output values at all.

As such, embodiments presented herein provide techniques for predictively starting a processing element. Embodiments may receive streaming data to be processed by a plurality of processing elements, where the processing elements processing at least a portion of the received data by operation of one or more computer processors. Additionally, an operator graph of the plurality of processing elements is established. Here, the operator graph defines at least one execution path and wherein at least one of the processing elements of the operator graph is configured to receive data from at least one upstream processing element and transmit data to at least one downstream processing element. Embodiments may also determine a historical startup time for a first processing element in the operator graph, where, once started, the first processing element begins normal operations once the first processing element has received a requisite amount of data from one or more upstream processing elements. Additionally, embodiments may determine an amount of time the first processing element takes to receive the requisite amount of data from the one or more upstream processing elements. The first processing element may then predictively started at a first startup time based on the determined historical startup time and the determined amount of time historically taken to receive the requisite amount of data. Advantageously, doing so helps to ensure that the first processing element will be started and have the requisite amount of data by the historical startup time and thus will be fully operational from the historical startup time.

Figure 1B:
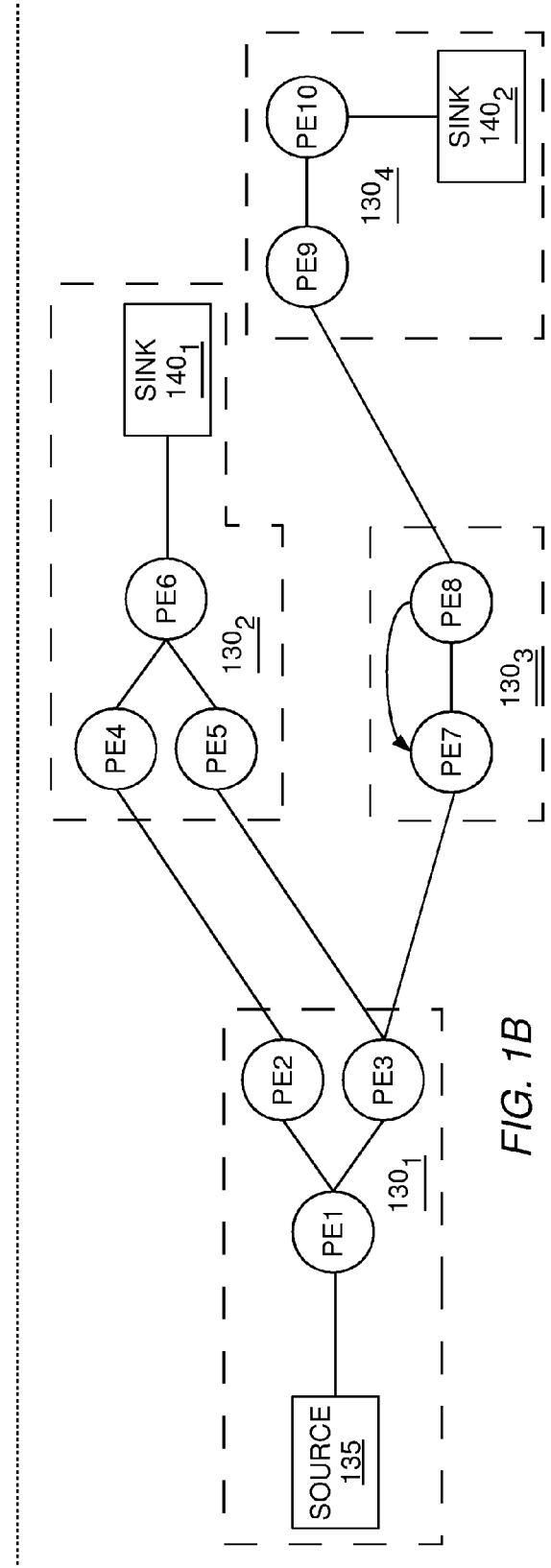

FIGS. 1A-1B illustrate a computing infrastructure configured to execute a stream computing application, according to one embodiment of the invention. As shown, the computing infrastructure 100 includes a management system 105 and a plurality of compute nodes $13_{01-4}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements (or what data-tuples flow to the processing elements) running on the compute nodes $130_{1-4}$. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. Of note, because a processing element is a collection of fused operators, it is equally correct to describe the operator graph as execution paths between specific operators, which may include execution paths to different operators within the same processing element. FIG. 1B illustrates execution paths between processing elements for the sake of clarity. While a processing element may be executed as an independently running process with its own process ID (PID) and memory space, multiple processing elements may also be fused to run as single process or job (with a PID and memory space). In cases where two (or more) processing elements are running independently, inter-process communication may occur using a "transport" (e.g., a network socket, a TCP/IP socket, or shared memory). However, when processes are fused together, the fused processing elements can use more rapid communication techniques for passing tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. Of note, although the operators within the processing elements are not shown in FIG. 1B, in one embodiment the data tuples flow between operators within the processing elements rather than between the processing elements themselves. For example, one or more operators within PE1 may split data attributes received in a tuple and pass some data attributes to one or more other operators within PE2, while passing other data attributes to one or more additional operators within PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 (i.e., from operator(s) within PE3 to operator(s) within PE5) also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
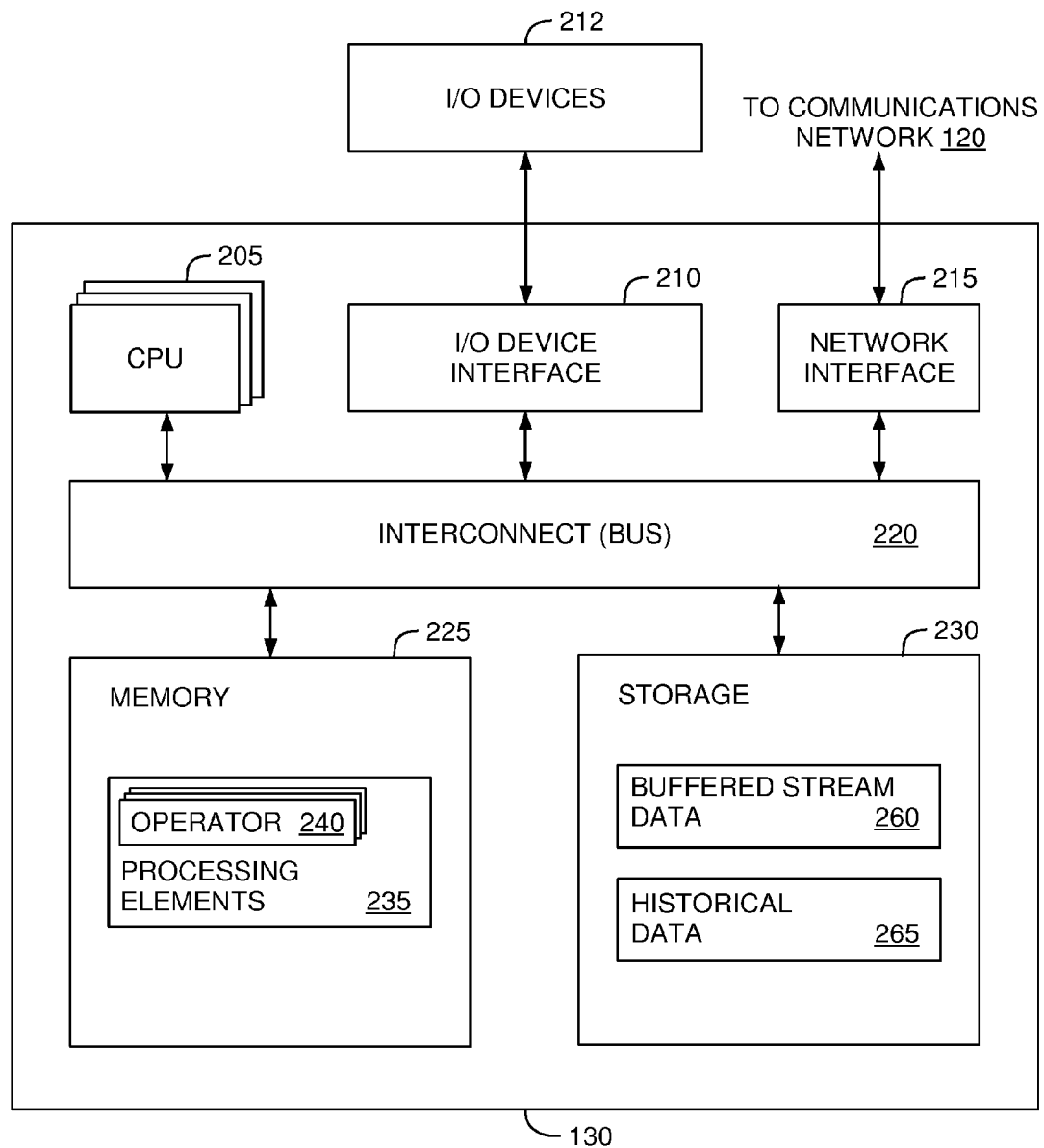
FIG. 2 is a more detailed view of the compute node of FIGS. 1A-1B, according to one embodiment described herein.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state disk (SSD), or flash memory storage drive, may store non-volatile data.

In this example, the memory 225 includes a plurality of processing elements 235. The processing elements 235 include a collection of operators 240. As noted above, each operator 240 may provide a processing routine configured to process data flowing into a processing element (e.g., PE 235) and to emit data to other operators 240 in that PE and to other processing elements in the stream computing application. Such processing elements may be on the same compute node 130 or on other compute nodes accessible over the data communications network 120. Memory 225 may also contain stream connection data (not shown) which represents the connections between PEs on compute node 130 (e.g., a TCP/IP socket connection between two separate PEs 235), as well as connections to other compute nodes 130 with upstream and or downstream PEs in the stream computing application, also via TCP/IP sockets (or other inter-process data communication mechanisms).

As shown, storage 230 contains buffered stream data 260 and historical data 265. The buffered stream data 260 represents a storage space for data flowing into the compute node 105 from upstream processing elements (or from a data source for the stream computing application). For example, buffered stream data 260 may include data tuples waiting to be processed by operators within one of the PEs 235—i.e., a buffer. Buffered stream data 260 may also store the results of data processing performed by operators within the processing elements 235 that will be sent to operators within downstream processing elements. For example, a PE 235 may have to store tuples intended for a downstream PE 235 if that PE 235 already has a full buffer, which may occur when the operator graph is experiencing backpressure. Storage also contains historical data 265, which represents previous output values from the various operators within the processing elements 235 in the stream computing application. Such historical data 265 could be used, for instance, to determine a substitute output for an particular operator which could be used as output for the operator instead of the normal output from the operator processing current input values. Such substitute output can be, for example, the average of a plurality of previously computed output values or the output value that corresponds to a particular input value received by the particular operator.

Figure 3:
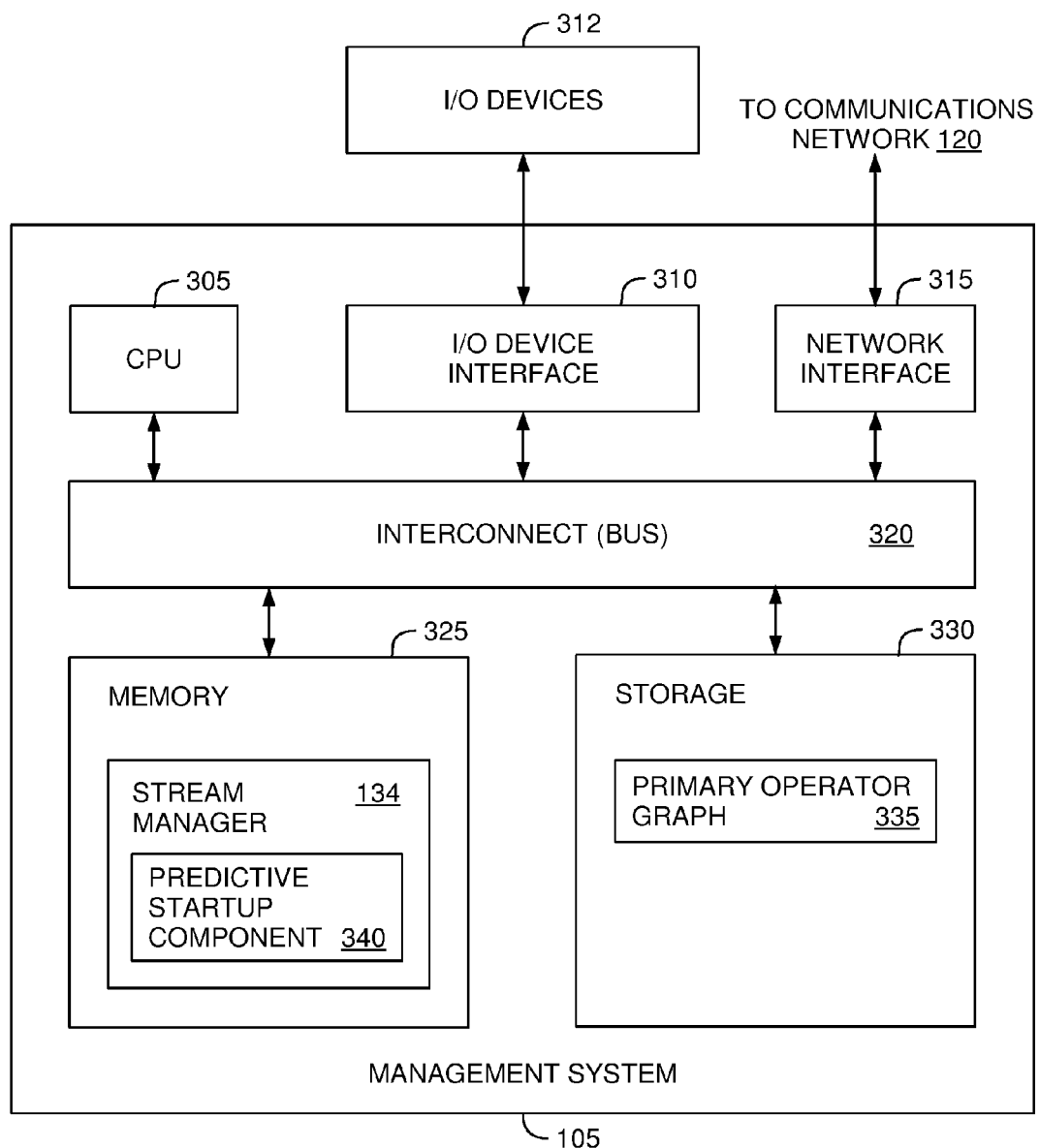
FIG. 3 is a more detailed view of the server computing system of FIG. 1, according to one embodiment described herein.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 335. The stream manager 134 may use the primary operator graph 335 to route tuples to PEs 235 for processing. The stream manager 134 also includes a predictive startup component 340. Generally, the predictive startup component 340 is configured to predictively start an offline processing element before a scheduled startup time for the processing element, such that the processing element will have received a requisite amount of data by the scheduled startup time. For instance, a particular processing element could be scheduled to start at 5:00 pm each day and has a requisite amount of data that the processing element must receive from upstream processing elements before beginning normal operations. For instance, the processing element could be configured with an operator that requires 10 tuples of data for normal operations. In such an example, the predictive startup component 340 could determine that the processing element has historically received data from the upstream processing elements at a rate of 1 tuple per minute. Based on this determination, the predictive startup component 340 could determine that it will take 10 minutes before the processing element is likely to have received the requisite amount of data. Accordingly, the predictive startup component 340 could predictively start the processing element at a time before the scheduled startup time (e.g., 4:50 pm), such that the processing element is likely to have received the requisite amount of data before the scheduled startup time and thus can immediately begin normal operations at the scheduled startup time. Advantageously, doing so provides enhanced startup capabilities for processing elements within the stream computing application and avoids delays where processing elements are started but are waiting to receive a requisite amount of data before beginning normal operation.

In one embodiment, the predictive startup component 340 may be further configured to calculate a substitute output for one or more upstream processing elements before the requisite amount of data has been received. Such an embodiment may be advantageous, for instance, when the processing elements are started in an impromptu fashion as opposed to a scheduled fashion. For instance, the predictive startup component 340 could be configured to predictively start a particular processing element based on historical data characterizing previous startup times of the processing element. Additionally, the predictive startup component 340 could be configured to predictively start the processing element based on when the processing element has been started in the past with respect to other processing elements. For instance, assume that the predictive startup component 340 determines that a first processing element has frequently been started shortly after a second processing element is started. In such an example, if the predictive startup component 340 detects the second processing element has been started, the predictive startup component 340 could perform an impromptu start on the first processing element based on the historical startup behavior of the first processing element.

Additionally, the predictive startup component 340 could retrieve historical output data for operators within an upstream processing element (e.g., historical data 265) and could use the historical data to estimate an output for the operators within the upstream processing element. For example, the predictive startup component 340 could calculate an average of historical outputs within a certain context (e.g., a window of time) and could use the calculated average as a substitute output value. As another example, the predictive startup component 340 could use the historical data to determine output patterns for the operators within the upstream processing element. As an example, the predictive startup component 340 could determine that after generating a particular series of output tuples, the upstream operators frequently generate a first tuple of data. As such, if the predictive startup component 340 determines that an upstream operator has again generated the series of output tuples, the predictive startup component 340 could generate the first tuple of data as a substitute output value for the upstream operator. Advantageously, doing so enables started processing elements that have not yet received the requisite amount of data to still begin generating output values using the generated substitute outputs for the upstream processing elements.

Figure 4:
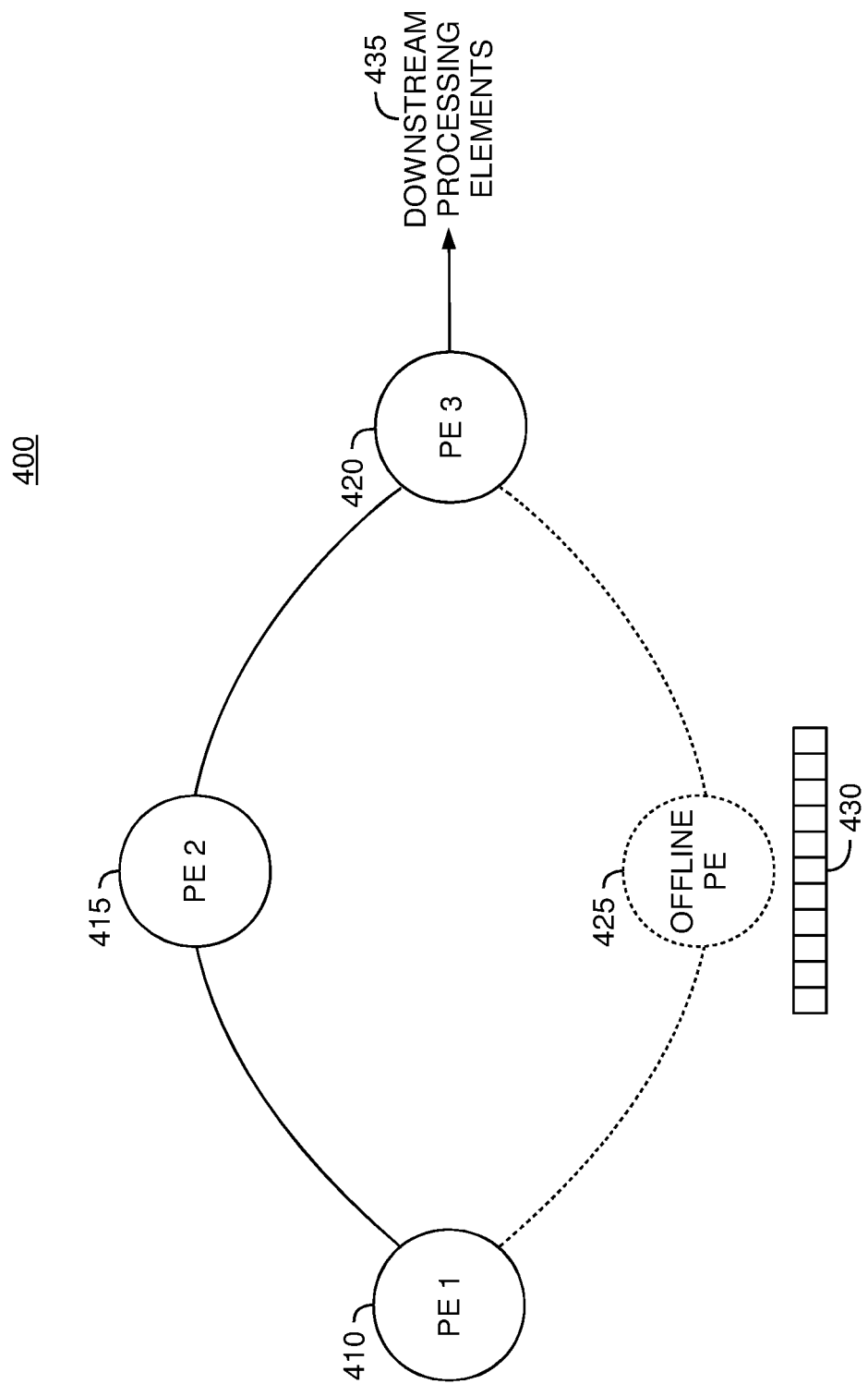
FIG. 4 illustrates a computing infrastructure configured to execute a stream computing application configured with a predictive startup component, according to one embodiment described herein.

FIG. 4 illustrates a computing infrastructure configured to execute a stream computing application configured with a predictive startup component, according to one embodiment described herein. As shown, the system 400 includes a PE 1 410, which includes operators (not shown) that transmit output values to operators within a PE 2 415 and operators within an offline PE 425. Of note, because a processing element is a collection of fused operators, it is equally correct to describe the operator graph as execution paths between specific operators, which may include execution paths to different operators within the same processing element. As such, FIG. 4 illustrates execution paths between processing elements for the sake of clarity. Returning to the depicted example, operators within the PE 2 415 and operators within the offline PE 425 transmit output values to operators within a PE 3 420, which in turn transmit output values to operators within one or more downstream processing elements 435. In the depicted example, the offline processing element 425 has a data buffer 430, indicating that the offline PE 425 has a requisite amount of data of 10 tuples of data. That is, the offline PE 425 must receive 10 tuples from the upstream operators within the PE 1 410 before the operators within the offline PE 425 can begin generating output tuples.

As discussed above, one advantage of stream computing application is that processing elements can be quickly moved into and out of the operator graph. As such, it may optimal in particular stream computing applications for certain processing elements to be offline until the processing elements are needed. However, since processing elements may need to receive a requisite amount of data before beginning normal processing operations, there often is a delay from when a processing element is started and when the processing element can begin normal processing operations.

Additionally, operators in the operator graph may have a requisite amount of data to be received from upstream processing elements before the processing elements can begin normal processing operations. In one embodiment, the requisite amount of data is represented as a window of data. For instance, the window of data could be, without limitation, a tumbling window of data or a sliding window of data. A tumbling window includes a one or more tuples (i.e., a chunk of divisible data) that after being processed by an operator 240 are discarded. In contrast, a sliding window may include tuples that were processed in a previously triggered sliding window.

For example, assume that a first operator is configured to use a tumbling window and a second operator is configured to use a sliding window. Further assume that both the first and second operators have received four initial tuples T1, T2, T3 and T4, such that each processing element has a buffer of {T1, T2, T3, T4}, and that the windowing parameters associated with the operator instructs the window activator to trigger a window once the buffer reaches a size of four tuples. Note that, in other embodiments, the operator can also be configured to trigger a window after a particular time period has elapsed.

After the window is triggered and the operator 240 evaluates the tuples within the window, the tuples within a tumbling window are discarded. Accordingly, when the next tuple of T5 is received by the first operator, the operator discards the previously received tuples T1, T2, T3 and T4 and stores the new tuple T5 in the buffer. Thus, the buffer of the first operator at this time is {T5}. The first operator in this example would then store subsequently received tuples in the buffer until a new window is triggered (e.g., after the buffer reaches a size of four tuples, after a particular period of time has elapsed, etc.)

In contrast, the second operator using a sliding window technique maintains a portion of the tuples in its buffer when subsequent tuples are received after a window is triggered. Like with tumbling windows, a sliding window may trigger initially based on whether the requisite number of tuples are received or if the predefined period of time has expired. However, unlike a tumbling window, a sliding window may trigger a window each time a subsequent tuple is received after the initial window is triggered. For example, if a stream application wants a four minute moving average of a stock ticker that is sampled every minute, the window activator for an operator could wait four minutes until four minutes worth of data arrives at the buffer and then could trigger a new window each time a new tuple is received or another minute passes. For purposes of the present example, assume that the second operator is configured to trigger a window after four tuples of data are received and thus triggers after the buffer contains the tuples {T1, T2, T3, T4}. When the second operator then receives the subsequent tuple T5, the second operator may expel one or more of the tuples from the previous window (e.g., the oldest tuple T1), but may include one or more of the tuples in the previous window in the new window. Thus, after receiving the tuple T5, the second operator could expel the tuple T1 from the buffer and could trigger a second window with the buffer {T2, T3, T4, T5}. Upon receiving the subsequent tuple T6, the second operator could expel the tuple T2, having a buffer of {T3, T4, T5, T6}, and so on.

Additionally, the window activator may wait for multiple time periods to pass, or multiple tuples to be received, before triggering a new sliding window. For example, the window activator may wait four time periods before triggering the first window but triggers a new sliding window every two time periods thereafter. Of course, all of the above examples are provided without limitation and are for illustrative purposes only. More generally, any form of a requisite amount of data or a window of data may be used in accordance with the embodiments described herein.

In the depicted embodiment, the predictive startup component 340 could determine an estimated amount of time until an operator within the offline processing element 425 receives enough tuples from operators within the upstream PE 1 410 to fill the data buffer 430. For example, the predictive startup component 340 could determine that the operators within the PE 1 410 historically generates tuples on an average of 1 tuple per 5 minutes. Based on this, the predictive startup component 340 could estimate that it will take approximately 50 minutes until the operator within the offline PE 425 has a full data buffer 430 of 10 tuples. Additionally, the predictive startup component 340 could determine a startup time for the offline processing element 425. For instance, the startup time could be an explicitly scheduled startup time. Such a scheduled startup time could be a one-time occurrence (e.g., 11:00 am on Dec. 8, 2011) or could be a recurring event (e.g., 5:00 am each day).

In one embodiment, the predictive startup component 340 can be configured to determine the startup time based on historical startup data for the offline processing element 425. Such historical startup data could specify, for instance, a log of previous startup times for the offline processing element 425. As an example, assume the historical startup data specifies that the offline processing element 425 was historically started at 5:00 pm every weekday. As such, the predictive startup component 340 could predict that the offline processing element 425 will again be started at 5:00 pm on a given weekday.

The predictive startup component 340 could then determine an adjusted startup time for the offline processing element 425, based on the determined amount of time and the determined startup time. For example, assume that the predictive startup component 340 determines that the operator within the offline processing element 425 needs 50 minutes in order to receive the requisite amount of data from the upstream processing element(s) and further determines that the startup time for the offline processing element 425 is 5:00 pm, the predictive startup component 340 could determine an adjusted startup time for the offline processing element 425 of 4:10 pm. That is, the predictive startup component 340 could determine an adjusted startup time such that, if the offline processing element 425 is started at the adjusted startup time, the operator within the offline processing element 425 will receive the requisite amount of data before the determined startup time.

The predictive startup component 340 could then predictively start the offline processing element 425 at the adjusted startup time. Advantageously, doing so helps reduce delays in the stream computing application, as the operator within the started processing element will have received the requisite amount of data by the startup time for the processing element. This avoids any delay caused by the operator having to wait after the startup time to receive the requisite amount of data in order to begin normal processing operations.

Figure 5:
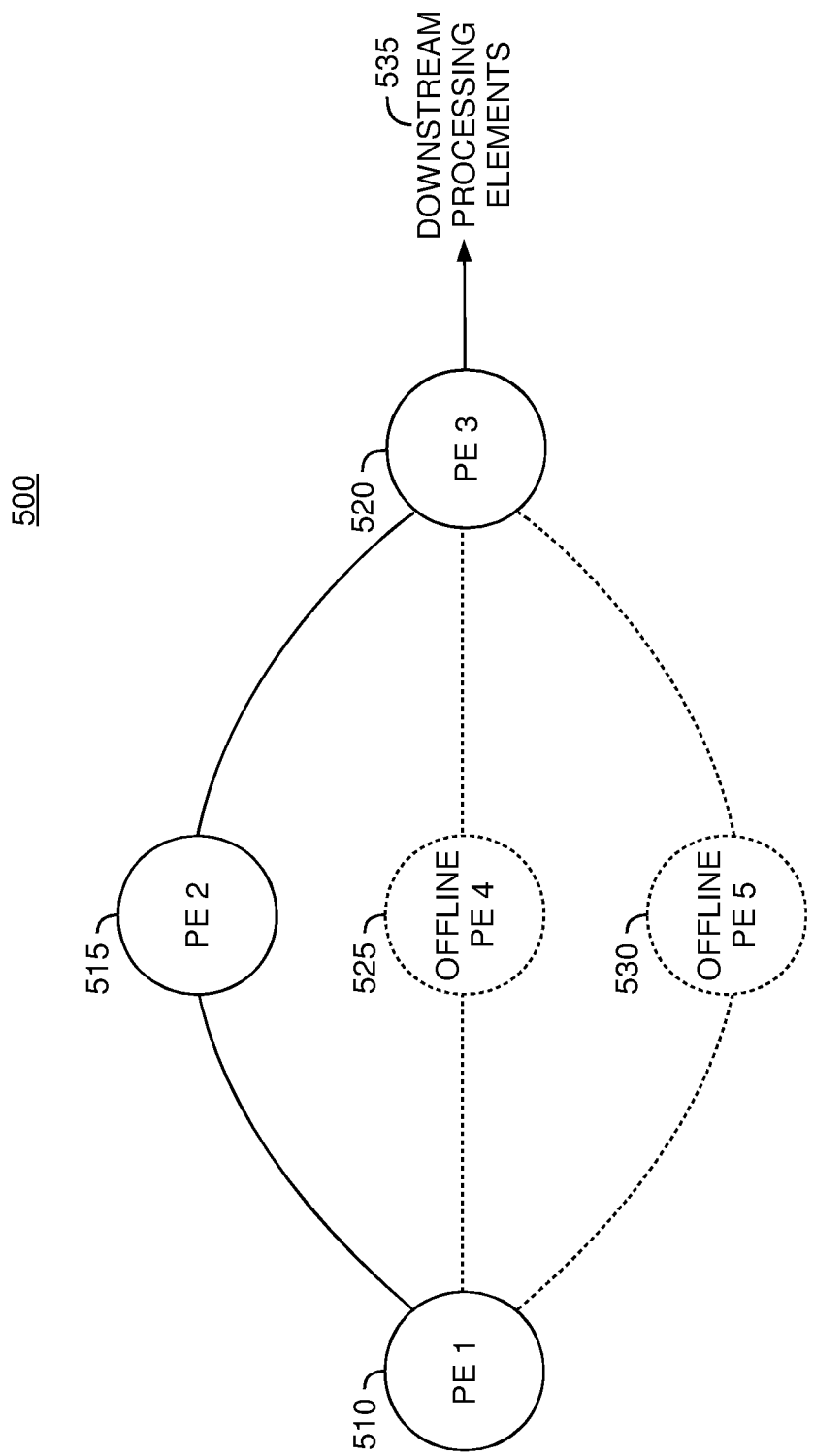
FIG. 5 illustrates a second computing infrastructure configured to execute a stream computing application configured with a predictive startup component, according to one embodiment described herein.

FIG. 5 illustrates a second computing infrastructure configured to execute a stream computing application configured with a predictive startup component, according to one embodiment described herein. As shown, the system 500 includes a processing element 1 510 which includes operators that transmit output to operators within a processing element 2 515, operators within an offline processing element 4 525 and operators within an offline processing element 5 530. Operators within the processing element 2 515, the offline processing element 4 525 (when online) and the offline processing element 5 530 (when online) are configured to transmit output to a processing element 3 520. Similarly, operators within the processing element 3 520 are configured to transmit output to one or more downstream processing elements 535.

As discussed above, the predictive startup component 340 may determine an adjusted time at which to predictively start the offline processing elements 525 and 530. However, each online processing element requires system resources (e.g., CPU cycles, memory, etc.) in order to run the processing element. As such, it may be advantageous for unused processing elements to remain offline whenever possible in order to conserve system resource. Furthermore, certain processing elements within a stream computing application may be considered more important than other processing elements. In such an embodiment, it may be advantageous for online the higher priority processing elements to be predictively started and for the lower priority processing elements to remain offline until their scheduled startup time.

Accordingly, in one embodiment, the predictive startup component 340 is configured to determine which, if any, of the offline processing elements 525 and 530 should be predictively started based on a priority value associated with the processing elements 525 and 530. For example, the predictive startup component 340 could determine that the offline processing element 4 525 is a high priority processing element but that the offline processing element 5 530 is a low priority processing element. As such, the predictive startup component 340 could determine to predictively start the processing element 4 525 at an adjusted startup time such that the processing element 525 will receive its requisite amount of data by its scheduled startup time. However, the predictive startup component 340 could determine not to predictively start the offline processing element 5 530 in order to conserve system resources because the processing element 530 is a low priority processing element. Advantageously, doing so enables the predictive startup component 340 to conserve system resources by selectively starting only particular processing elements (e.g., higher priority processing elements) before their scheduled startup time.

Figure 6:
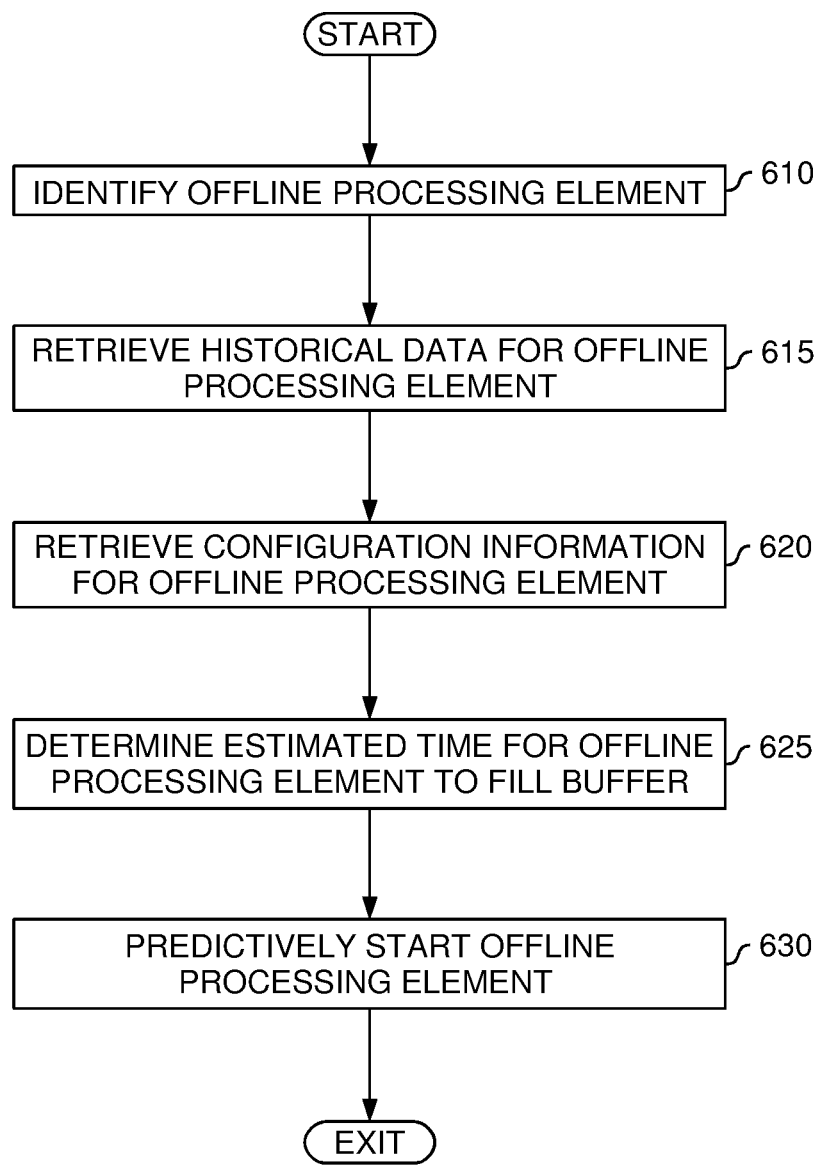
FIG. 6 is a flow diagram illustrating a method for predictively starting a processing element in a stream computing application, according to one embodiment described herein.

FIG. 6 is a flow diagram illustrating a method for predictively starting a processing element in a stream computing application, according to one embodiment described herein. As shown, the method 600 begins at step 610, where the predictive startup component 340 identifies an offline processing element within the operator graph of a stream computing application. The predictive startup component 340 then retrieves historical data for the offline processing element (step 615). Such historical data could specify, for example, historical startup time information for the processing element which includes timestamps for times when the processing element was previously started. The historical data could also specify a rate at which the operators within the offline processing element have previously received data from operators within upstream processing elements (or data from which such a rate could be determined). The predictive startup component 340 could then use this rate information in determining an adjusted startup time for the offline processing element.

Additionally, the historical data could specify previous output values for one or more operators within processing elements upstream of the offline processing element. The predictive startup component 340 could then use such previous output information, for instance, to generate substitute output values for the upstream operators, which the operators within the offline processing element (once started) could use to generate output before it has received its requisite amount of data from the upstream operators.

Additionally, the predictive startup component 340 retrieves configuration information for the offline processing element (step 620). Such configuration information could specify, for instance, a scheduled startup time for the offline processing element. Furthermore, the configuration information could specify a requisite amount of data that the offline processing element must receive from upstream processing elements before the offline processing element can begin normal processing operations. For example, the configuration information could specify that the offline processing element needs to receive 25 tuples of data from an upstream processing element once the offline processing element is started before the offline processing element can begin generating output.

The predictive startup component 340 then determines an estimated amount of time that it will take for an operator within the offline processing element to fill its data buffer (step 625). For instance, the predictive startup component 340 could use the rate information specified in the historical data and the requisite amount of data from the configuration information in order to determine the estimated amount of time. As an example, if the predictive startup component 340 determines that an operator within the offline processing element historically has received 5 tuple per minute from the upstream operators and the operators within the offline processing element has a requisite amount of data of 25 tuples, the predictive startup component 340 could determine that is will take 5 minutes for the operator within the offline tuple to receive the requisite amount of data. In one embodiment, the predictive startup component 340 may also adjust the estimated amount of time to ensure that there is sufficient time for the operator to receive the requisite amount of data. For instance, the predictive startup component 340 could add a constant amount of time to the estimated amount of time (e.g., 5 minutes) or the predictive startup component 340 could adjust the estimated amount of time by a multiplier (e.g., an additional 20% of time) to ensure that there is sufficient time for the operator to receive the requisite amount of data.

The predictive startup component 340 then predictively starts the offline processing element at a time such that the processing element will receive the requisite amount of data before its scheduled startup time (step 630) and the method 600 ends. For example, the predictive startup component 340 could determine a scheduled startup time for the offline processing element (e.g., using the retrieved configuration information) and could predictively start the offline processing element by the determined estimated amount of time before the scheduled startup time. For instance, the predictive startup component 340 could estimate that it will take 5 minutes for the operator within the offline processing element to receive its requisite amount of data once started and could adjust this estimated amount of time by a constant of 5 minutes of time. If the predictive startup component 340 then determines that the offline processing element is scheduled to be started at 10:00 am, the predictive startup component 340 could predictively start the offline processing element at 9:50 am (e.g., the estimated amount of time in addition to the constant amount of time) to ensure that the processing element will receive the requisite amount of data by the scheduled startup time. Advantageously, doing so avoids delay in the stream computing application caused by processing elements waiting for data from upstream processing elements after their scheduled startup times.

Figure 7:
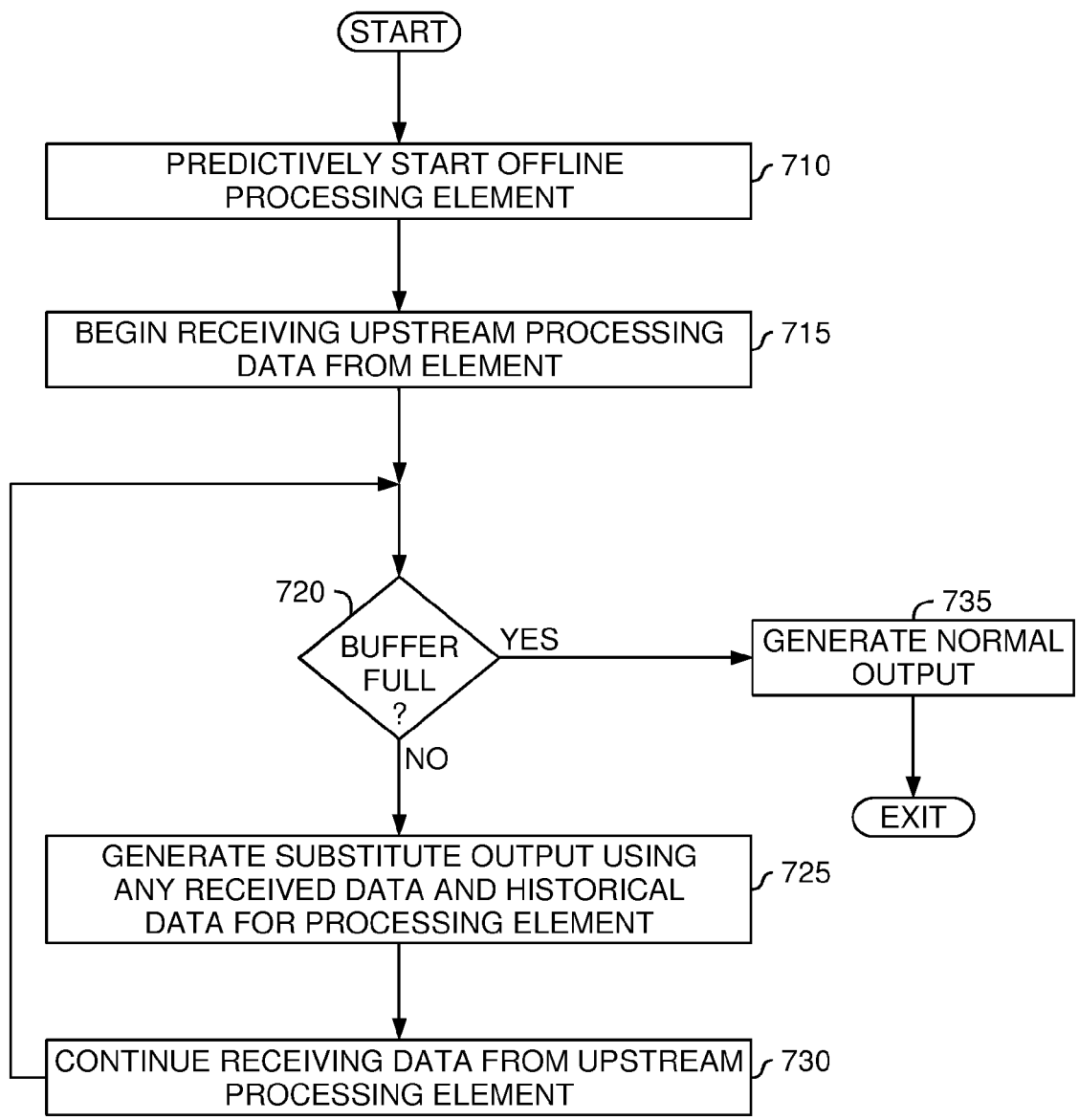
FIG. 7 is a flow diagram illustrating a method for providing substitute output for a processing element, according to one embodiment described herein.

FIG. 7 is a flow diagram illustrating a method for providing substitute output for an operator within a processing element, according to one embodiment described herein. As shown, the method 700 begins at step 710, where the predictive startup component 340 predictively starts an offline processing element (e.g., using the method 600 discussed above in the discussion of FIG. 6). The started processing element then begins receiving data from one or more operators within an upstream processing element (step 715). As discussed above, operators within the stream computing application may have a requisite amount of data they must receive before beginning normal processing operations. As such, the predictive startup component 340 determines whether the data buffer for the operator within the started processing element is full, indicating that the operator has received the requisite amount of data (step 720). If the operator has received the requisite amount of data, the operator generates one or more output values under normal operations (step 735) and the method 700 ends.

If instead the predictive startup component 340 determines that the buffer is not yet full (i.e., the operator has not yet received the requisite amount of data from the upstream operators), then the predictive startup component 340 generates substitute output values for the upstream operators sufficient to fill the data buffer for the operator within the started processing element (step 725). For instance, if the operator within the started processing element has a requisite amount of data of 10 tuples and the operator has already received 8 tuples of data from the upstream operators, the predictive startup component 340 could generate 2 tuples of substitute output in order to fill the data buffer. The predictive startup component 340 may generate the substitute output based on, for instance, historical output values produced by the upstream operators. Additionally, the predictive startup component 340 could generate the substitute output based on any already-received data from the upstream operators. As an example, the predictive startup component 340 could calculate an average of the historical output values and/or the already-received data and could use the calculated average as the substitute output for the upstream operators. Advantageously, doing so allows the operator within the started processing element to begin generating output data values before the requisite amount of data is received from the upstream operators. Once the substitute output is generated, the processing element continues receiving data from the upstream operators (step 730) and the method 700 returns to step 720.

In one embodiment, the predictive startup component 340 is configured to identify patterns in the output generated by an upstream operator. For instance, the predictive startup component 340 could determine (e.g., using historical output data for the upstream processing element) that the upstream operator frequently generates a particular tuple of data after generating a series of other tuples. If the predictive startup component 340 then determines the upstream operator has again generated the series of other tuples as output, the predictive startup component 340 could generate the particular tuple as substitute output based on the identified pattern. Advantageously, doing so allows the predictive startup component 340 to generate more accurate substitute output by identifying output patterns for the upstream operator.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a stream computing application configured with a predictive startup component could execute across one or more nodes within the cloud. The predictive startup component within the stream computing application could determine a historical startup time for a particular processing element with the stream computing application and could further determine a historical time taken for the particular processing element to receive the requisite amount of data from upstream processing elements. The predictive startup component could then start the processing element at a time before the historical startup time, such that the processing element receives the requisite amount of data from the upstream processing element by the historical startup time. Doing so provides an enhanced stream computing application which users may access from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a memory containing a program that, when executed by the processor, performs an operation for predictively starting a processing element, comprising:
receiving streaming data to be processed by a plurality of operators, wherein each of the plurality of operators is configured to perform a respective one or more operations on received units of data;
establishing an operator graph through the plurality of operators that defines at least one execution path through the plurality of operators, and wherein at least one of the plurality of operators is configured to receive data from at least one upstream operator and transmit data to at least one downstream operator;
determining a respective historical startup time for each of two or more operators in the operator graph, which, once started, begin performing the respective one or more operations upon receiving a respective requisite amount of data from a respective one or more upstream operators;
determining, for each of the two or more operators, a respective estimated amount of time the respective operator takes to receive the requisite amount of data from the respective one or more upstream operators, based on a rate at which data was historically received from the respective one or more upstream operators; and
predictively starting each of the two or more operators at a respective startup time prior to the respective historical startup time based on the respective estimated amount of time historically taken to receive the requisite amount of data, such that the operator receives the requisite amount of data for performing the respective one or more operators by the determined historical startup time.

2. The system of claim 1, the operation further comprising:
retrieving a startup log for one of the two or more operators, wherein the startup log specifies one or more timestamps when the first operator was started; and
determining the historical startup time based on the one or more timestamps.

3. The system of claim 1, the operation further comprising:
once a first one of the two or more operators is started, but before the first operator has received the requisite amount of data, generating substitute output for each of the corresponding one or more upstream operators.

4. The system of claim 3, wherein the substitute output is generated based on historical output generated from a delayed upstream operator.

5. The system of claim 3, wherein a portion of output has been received from one of the one or more upstream operators, and wherein the substitute output is generated based on the received portion of output.

6. A computer program product for predictively starting a processing element, comprising:
a computer-readable storage medium having computer readable program code embodied therewith, the computer readable program code comprising:
computer readable program code to receive streaming data to be processed by a plurality of operators, wherein each of the plurality of operators is configured to perform a respective one or more operations on received units of data;
computer readable program code to establish an operator graph through the plurality of operators that defines at least one execution path through the plurality of operators, and wherein at least one of the plurality of operators is configured to receive data from at least one upstream operator and transmit data to at least one downstream operator;
computer readable program code to determine a respective historical startup time for each of two or more operators in the operator graph, which, once started, begin performing the respective one or more operations upon receiving a respective requisite amount of data from a respective one or more upstream operators;
computer readable program code to determine, for each of the two or more operators, a respective estimated amount of time the respective operator takes to receive the requisite amount of data from the respective one or more upstream operators, based on a rate at which data was historically received from the respective one or more upstream operators; and
computer readable program code to predictively start each of the two or more operators at a respective startup time prior to the respective historical startup time based on the respective estimated amount of time historically taken to receive the requisite amount of data, such that the operator receives the requisite amount of data for performing the respective one or more operators by the determined historical startup time.

7. The computer program product of claim 6, the computer readable program code further comprising:
computer readable program code to retrieve a startup log for one of the two or more operators, wherein the startup log specifies one or more timestamps when the first operator was started; and
computer readable program code to determine the historical startup time based on the one or more timestamps.

8. The computer program product of claim 6, the computer readable program code further comprising:
computer readable program code to, once a first one of the two or more operators is started, but before the first operator has received the requisite amount of data, generate substitute output for each of the corresponding one or more upstream operators.

9. The computer program product of claim 8, wherein the substitute output is generated based on historical output generated from the upstream operators.

10. The computer program product of claim 8, wherein a portion of output has been received from one of the one or more upstream operators, and wherein the substitute output is generated based on the received portion of output.

11. A system, comprising:
a processor; and
a memory containing a program that, when executed by the processor, performs an operation for predictively starting a processing element, comprising:
receiving streaming data to be processed by a plurality of operators, each configured to perform a respective one or more operations on received units of data;
establishing an operator graph through the plurality of operators that defines an execution path through the plurality of operators, and wherein at least one of the plurality of operators is configured to receive data from at least one upstream operator and transmit data to at least one downstream operator;
determining historical startup times for two or more operators in the operator graph, wherein the two or more operators, once started, begin performing the respective one or more operations upon receiving a respective requisite amount of data from respective one or more upstream operators;
determining, for each of the two or more operators, a respective estimated amount of time the operator takes to receive the requisite amount of data from the one or more upstream operators, based on a size of the requisite amount of data and a rate at which data was historically received at the operator from the one or more upstream operators; and
for each of the two or more operators, predictively starting the operator at a respective startup time prior to the determined historical startup time for the operator, based on the determined amount of time historically taken to receive the requisite amount of data, such that the first operator receives the requisite amount of data for performing the respective one or more operators by the determined historical startup time.

* * * * *